May 19, 1953 C. SAURER 2,639,188
AUXILIARY WIND DEFLECTOR
Filed Dec. 13, 1949 2 Sheets-Sheet 1
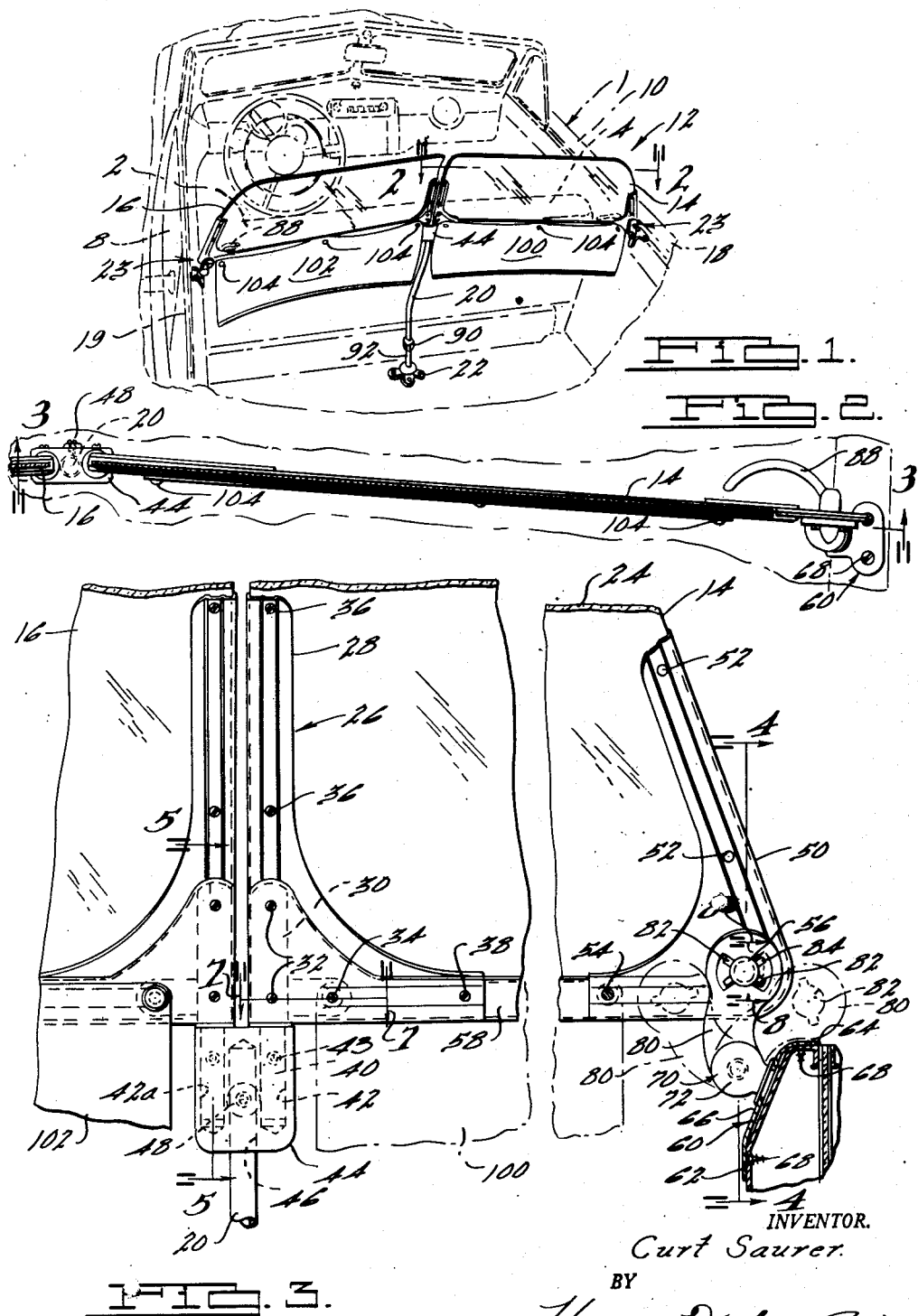
INVENTOR.
Curt Saurer.
BY
Harness, Dickey & Pierce
ATTORNEYS.

May 19, 1953  C. SAURER  2,639,188
AUXILIARY WIND DEFLECTOR
Filed Dec. 13, 1949  2 Sheets-Sheet 2
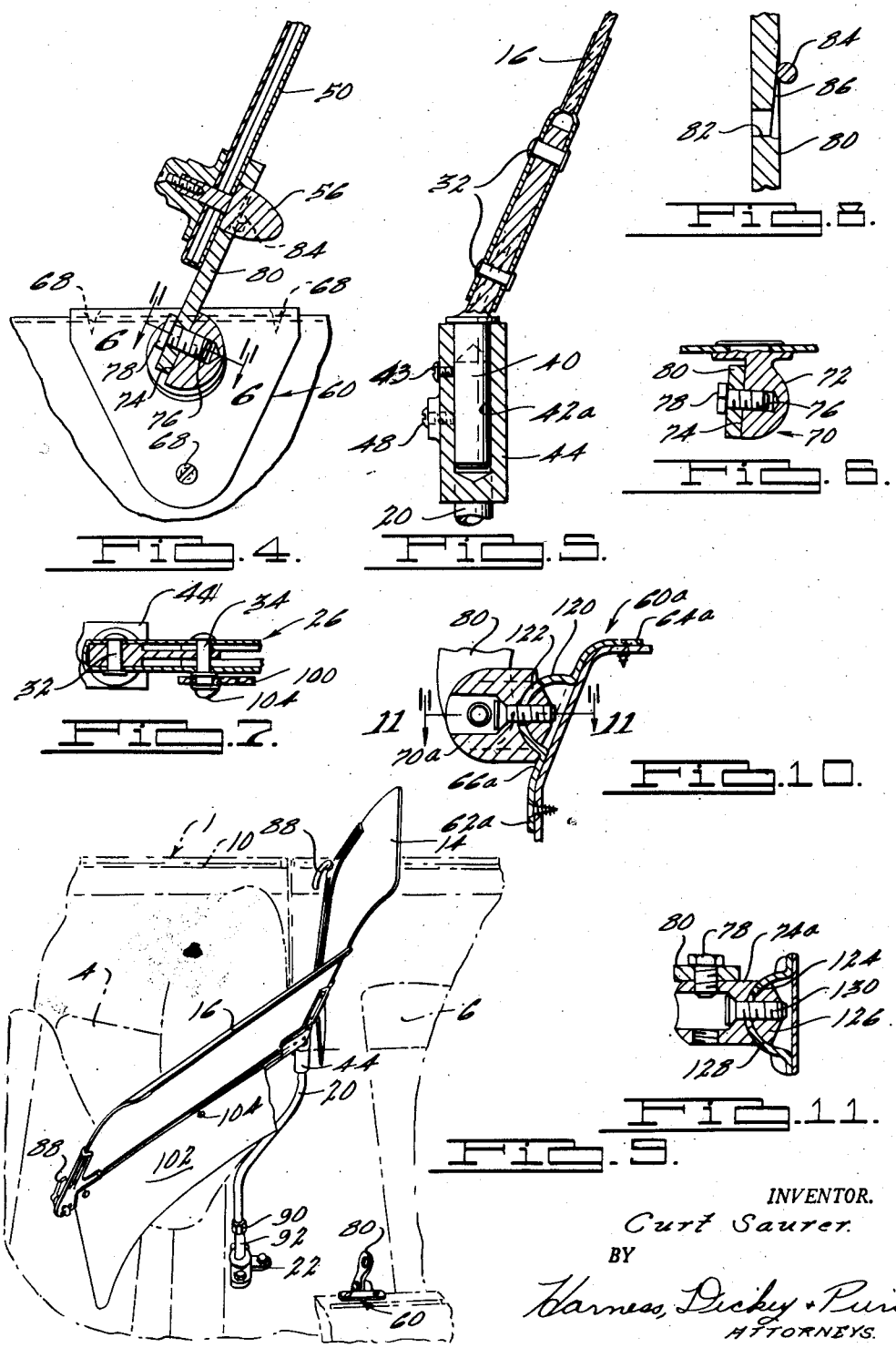
INVENTOR.
Curt Saurer.
BY
Harness, Dickey & Pierce.
ATTORNEYS.

Patented May 19, 1953

2,639,188

UNITED STATES PATENT OFFICE 2,639,188

AUXILIARY WIND DEFLECTOR

Curt Saurer, Detroit, Mich.

Application December 13, 1949, Serial No. 132,651

7 Claims. (Cl. 296—85)

This invention relates generally to wind deflectors and is especially adapted among other uses for wind deflectors for the rear seat of a motor vehicle having front and rear seats.

An object of this invention is to provide such a wind deflector which may be easily and quickly attached to existing motor vehicles.

Another object is to provide such a deflector which may be economically and easily manufactured.

Another object of this invention is to provide such a deflector which may be manufactured in a single size and which may be used in connection with substantially all of the present day standard vehicles.

Another object of this invention is to provide such a deflector which can be easily moved to permit ingress and egress from the rear motor vehicle seat.

Another object of this invention is to provide a new and improved securing means for the deflector.

A further object is to provide such a securing means which is adjusted to compensate for motor vehicles of different widths.

A still further object of this invention is to provide such a deflector which may be secured adjacent the rear of the front seat of the motor vehicle.

A still further object of this invention is to provide an anti-backdraft flap to prevent drafts upwardly in front of the deflector which would be objectionable to occupants of the front seat.

A still further object is to provide a wind deflector structure comprising two pivoted sections supported centrally of the vehicle.

Another object is to provide such a structure in which the central support is carried by the vehicle floor.

Other objects of this invention will be apparent from the specification, the appended claims and drawings in which drawings:

Figure 1 shows a portion of a motor vehicle equipped with a wind deflector embodying the invention;

Fig. 2 is a view taken substantially along the line 2—2 of Fig. 1;

Fig. 3 is a view taken substantially along the line 3—3 of Fig. 2;

Fig. 4 is a view taken substantially along the line 4—4 of Fig. 3;

Fig. 5 is a view taken substantially along the line 5—5 of Fig. 3;

Fig. 6 is a view taken substantially along the line 6—6 of Fig. 4;

Fig. 7 is a view taken substantially along the line 7—7 of Fig. 3;

Fig. 8 is a view taken substantially along the line 8—8 of Fig. 3;

Fig. 9 is a partial view of a motor vehicle embodying my invention and showing the deflector in a partially rotated position to permit ingress and egress to the rear seat;

Fig. 10 is a view showing a modified form of attachment for the adjustable locking means; and Fig. 11 is a view taken substantially along the line 11—11 of Fig. 10.

Motor vehicles of the type commonly known as two door convertibles are popular since they may be operated during fair weather with the top folded back whereby the occupants have an almost completely unobstructed view as they ride and enjoy the feeling of openness. These body styles are almost universally provided with a front windshield which deflects the oncoming air so that it is unobjectionable to occupants of the front seat but which subjects occupants of the rear seat to numerous drafts due to the air currents which it sets up. I am aware that others have provided additional wind deflecting means carried by the motor vehicle adjacent the rear of the front seat but such wind deflectors have been expensive to manufacture and difficult to install in the motor vehicle and consequently have not been used to any substantial extent. My present wind deflector is economical of manufacture since it is built up almost entirely of stamped or die cast parts which may be made cheaply in large production. Furthermore this wind deflector may be made in quantities and applied to existing motor vehicles with a minimum of effort and by persons having no exceptional skill.

Referring to the drawings by characters of reference, the numeral 1 designates generally a motor vehicle of the type known as a two door convertible which is provided with a front or driver's seat having the usual two separate pivotal back sections 2 and 4 and a rear seat 6, a portion of which is shown in Fig. 9. Ingress and egress to the motor vehicle is accomplished through either a left-hand door 8 or right-hand door 10 which is in general registry with the front motor vehicle seat. When it is desired to obtain access to the rear seat 6, one or the other of the backs 2 or 4 of the front seat is pivoted forwardly over the seating surface of the front seat whereby persons may step through one of the doors 8 or 10 past the front seat and into the space in front of the rear seat 6.

My wind deflector generally designated 12 is positioned immediately adjacent the rear of the backs 2 and 4 of the front seat and comprises a right-hand section 14 and a left-hand section 16 arranged in wide V formation and having the adjacent end portions pivotally supported in a hinge member 44 carried by a post 20. The post 20 is supported by means of a bracket 22 suitably secured to the floor by bolts or other suitable securing means. The opposite outer end portions of the deflectors 14 and 16 are secured to the side walls 18 and 19 rearwardly of the doors 10 and 8 by means of locking mechanisms generally designated 23.

Since the construction of each of the deflectors 14 and 16 is identical except that 14 is a right-hand deflector and 16 is a left-hand deflector, a detailed description of only the deflector 14 will be given.

The deflector 14 comprises generally a sheet of transparent material 24 which is suitably secured along its lower edge and portions of its right and left hand vertical edges by means of a frame generally designated 26. The frame 26 comprises a left-hand substantially L-shaped portion 28 which is preferably of channel shape in cross section whereby the transparent material may be received within the formed channel. The transparent material 24 has its lower left-hand corner rounded to permit a hinge member 30 to be received upwardly into the inside of the channel at the corner of the L-shaped bracket portion 28. The hinge member 30 is secured to the bracket portion 28 by means of screws 32 and 34 and the transparent material is secured to this bracket portion 28 by means of screws 36 and 38. The hinge member 30 is provided with a downwardly extending hinge pin 40 which is received within an upwardly opening aperture 42 in a female hinge member 44 having a downwardly extending central aperture 46 which fits over the upper end of the post 20 and which may be secured thereto as by means of set screw 48. The pin 40 is preferably at an angle relative to the portion of the member 30 within the frame 26 to rearwardly tilt the deflector 14. A set screw 43 is provided in hinge 44 for pin 40 which may be optionally tightened.

The right-hand side of the deflector 14 is provided with a substantially V-shaped bracket member portion 50 which is substantially U-shaped in cross section to provide a channel for receiving the right-hand edge of the transparent sheet 24 and a portion of the lower edge thereof. The transparent panel 24 may be secured within the channel of the frame portion 50 by means of screws 52 and 54. The lower right-hand corner of the transparent panel 24 is cut away to permit a male member 56 of a bayonet-type locking pin to extend through and be journaled within the lower right-hand corner of the frame portion 50. An upwardly opening channel member 58 fits over the lower edge of the transparent panel 24 and is received at its opposite end portions within the adjacent portions of the frame portions 28 and 50 and is held thereto by means of the previously mentioned screws 38 and 54. It will be apparent that if desired the frame member may be continued completely around the panel although I have found that this is generally unnecessary and provides an unwarranted additional cost besides being less pleasing to the eye.

In order that the frame member 50 may be anchored to the adjacent wall 13 of the motor vehicle and in a manner in which no stress is imparted to the deflector 14, I provide a bracket 60 having a lower substantially vertical extending portion 62 and an upper substantially horizontal portion 64 connected by means of a diagonally extending central portion 66. The bracket 60 may be secured to the wall 13 by means of screws 68 which may be of the sheet metal type. The diagonally extending portion 66 is apertured to receive a base knob or lug 70 which extends substantially normally of the surface of the portion 66 and which is provided with a substantially semi-spherical surface 72 and a substantially planar surface 74. The base knob is provided with a threaded aperture 76 opening outwardly through the surface 74 and which receives a stud 78 which extends through an aperture in a lock plate or arm 80 which is held by the stud in adjusted position with respect to the base knob 70 against the surface 74.

The lock plate 80 extends outwardly from the base knob 70 and is provided at its upper end with a bayonet receiving aperture 82 which comprises a substantially circular portion with diametrically oppositely extending recesses for receiving the bayonet locking pin 84 carried by the bayonet lock pin 56. In order that the bayonet locking pin 84 may clampingly secure the frame portion 50 to the lock plate, the lock plate 80 is provided with a tapered surface 86 leading outwardly from the aperture 82 so that as the lock pin 56 is rotated in a counterclockwise direction as viewed in Fig. 3 by means of the locking handle 88 (Fig. 2) a progressively tighter engagement will be produced.

Vertical adjustment of the post 20 is provided by means of the usual telescoping of the members and tapering nut 90 and lateral and vertical adjustment of the lock plate 80 whereby the deflector 12 may be applied to motor vehicles of varying widths and with the desired V angle between the deflectors 14 and 16. Changes in vertical dimension of the aperture 82 are compensated for by the vertical adjustment of the post 20 so that when the deflector 12 is assembled and adjusted there is no deforming strain but the parts are in perfect alignment with each other.

In assembling the wind deflector 12 to the motor vehicle 1, the flange 22 is first suitably secured to the floor of the motor vehicle immediately back of the front seat. If the front seat is of the adjustable variety the flange 22 should be placed just rearwardly of the rearwardmost position of the front seat. The flange 22 is provided with a short upwardly extending conduit portion 92 which is split at its upper end portion and externally threaded for receiving the tapered locking nut 90. The lower end of the post 20 telescopes downwardly within the conduit portion 92. The upper end of the post 20 is initially adjusted to a position substantially level with the backs 2 and 4 of the front seat. The clamping nut 90 is partially tightened to prevent free movement but permits a frictional movement between the post 20 and conduit section 92. The female hinge member 44 is then placed over the top end of the post 20 and secured thereto by tightening the set screw 48 so that its two oppositely upwardly opening recesses 42 and 42a lie in a plane substantially transverse to the motor vehicle. The assembled deflectors 14 and 16 are then assembled to the hinge member 44 as by inserting their male hinge portions 40 into the recesses 42 and 42a respectively. The deflectors 14 and 16 are then placed at the desired angle with respect to each other and the brackets 60 are then secured to the respectively adjacent motor vehicle walls 18 and 19. The stud 78 is loosened on the base knob 70 to permit swinging of the lock plate into a position in which the bayonet receiving aperture 82 aligns with the lock pin 56 thereof after which the stud 78 is tightened to maintain the lock plate 80 in adjusted position with respect to the base knob 70 and the post 20 raised or lowered to perfectly align the pin with the aperture 82. The nut 90 is then tightened to hold the post in adjusted position. If desired additional adjustment may be made by the positioning of the hinge member 44 by the set screw 48.

When it is desired to make an ingress or egress from the rear seat of the vehicle the appropriate door 8 or 10 is opened and the appropriate one of the handles 88 is rotated to permit the bayonet locking pins 84 to align with the enlargements of the aperture 82 and permit forward rotation of the wind deflector 14 or 16 up against the forwardly tilted back of the front seat as shown in Fig. 9. In this position of the front seat back and of the wind deflector, convenient access may be had to the rear seat for the ingress and egress of passengers. Of course after the ingress or egress has been made, the deflector is again rotated bringing the lock pin 56 through the aperture 82 after which the handle 88 is rotated to cam the lock pins 84 on the surface 86 to provide a tight securement for the outside corner of the deflector 14 or 16.

In order to prevent back drafts up along the rear of the back of the front seat and in front of the deflectors 14 and 16, the deflectors are provided with flaps 100 and 102 which may be secured at their upper edges by snaps 104 to the lower edge of the frame 26. The screws 34 and 54 and an intermediate one of the screws 38 (not shown) may be provided with heads of the proper character for snappingly receiving the snap buttons carried by the flaps 100 and 102. These snaps 104 may be of any usual variety purchasable on the market and are consequently not shown in detail in this application.

In Figs. 10 and 11 there is shown a modified form of bracket 60a and means for attaching the lock plate 80 thereto. The bracket 60a comprises the upper substantially horizontally extending portion 64a and the lower substantially vertical portion 62a connected by an intermediate diagonally extending portion 66a. The portion 66a is provided with a substantially semi-cylindrical outwardly extending boss 120 which is apertured as at 122. The base knob 70a is provided with a flat surface 74a against which one end portion of the locking plate 80 is seated and held in adjusted position by means of the stud 78. The base knob 70a is provided with a concave substantially spherical surface 124 which is of slightly less radius than the outer spherical surface of the boss 120 and seats thereagainst. A nut 126 is provided with a substantially semispherical surface 128 which is of slightly greater radius than the concave surface of the boss 120. A screw 130 extends through a lower central aperture of the base knob 74a and is screw threaded into the nut 126. Initially the screw 130 is left loose and after assembly of the wind deflector into the motor vehicle the screw 130 is tightened to provide an adjusted locked relation between the base knob 74a and the bracket 60a.

What is claimed and is desired to be secured by United States Letters Patent is as follows:

1. An article for use with a motor vehicle having side walls and a floor, a supporting post adapted to be secured to such floor at the rear of such seat and extending upwardly of such floor to a point adjacent the top of such seat, a hinge block carried by said post at its upper end and having a pair of vertically extending upwardly opening holes, a pair of hinge brackets each having a vertically extending cylindrical pin, said pins being individually received within said holes, a frame carried by each of said brackets and extending outwardly therefrom toward respective adjacent ones of such walls, and having means to support a wind deflecting member in a plane extending at an angle relative to the vertical, a bracket carried by each such wall and releasable means for individually securing said frames to respective ones of said brackets.

2. The combination of claim 1 in which a flap is carried by one of said frames and extends downwardly therefrom closely adjacent such seat and is cooperable with such seat to prevent updrafts between such seat and said one frame.

3. In an article of the character described, a supporting member adapted to be secured to the floor of a motor vehicle and including a hinge member, a pair of frame members adapted to support wind deflectors, each of said frame members being provided adjacent one end portion thereof with a second hinge member, said hinge members cooperating together to hingedly support said frame members, a pair of latching mechanisms each comprising a pair of elements, one of each of said pair of elements being solely and individually carried by a second end portion of each of said frame members, and arms pivotally secured to spaced portions of such vehicle for adjustably supporting the other of each of said pairs of elements for movement relative to such spaced portions of such vehicle, said pairs of elements of each said latching mechanism being partable for releasably positioning said frame members in such vehicle.

4. In an article of the character described, a supporting member adapted to be secured to the floor of a motor vehicle and including a hinge member and means for adjusting the height of said hinge member from such floor, a pair of frame members lying in a nonvertical plane and adapted to support wind deflectors, each of said frame members being provided adjacent one end portion thereof with a second hinge member, the mutually engaging portions of said hinge members being positioned in a vertical plane and cooperating together to hingedly support said frame members for rotation about a vertical axis, a pair of latching mechanisms each comprising a pair of elements, one of each of said pair of elements being individually carried by a second end portion of each of said frame members, a pair of securements adapted to be secured to spaced portions of such vehicle, an arm pivotally carried by each said securement, the other of each of said pairs of elements being individually carried by said arms, said arms and said height adjusting means cooperating together to permit installation of the article within motor vehicles of varying widths and with said frame members forming a desired angle therebetween.

5. The combination of claim 4 in which said securements each comprise a base member adapted to be individually secured to side walls of such vehicle, said base members each being provided with an outstanding lug, and said arms being adjustably carried on said lugs.

6. The combination of claim 5 in which each said base member is provided with a convex boss having an aperture therethrough, each said lug being provided with a concave surface for receiving the said boss of the said base member with which it is cooperable, each said lug being provided with an aperture opening through its said concave surface, and a clamping member individually extending through said apertures of each said cooperating lug and base member for adjustably securing said lugs to their respective said base members.

7. An adjustable support of the character described comprising a base plate having a substantially semispherically-shaped surface portion providing an outer convex surface and an inner concave surface, a lug having a substantially semispherically-shaped surface portion, said lug portions being concave and cooperable with said plate convex surface whereby they mutually cooperate to provide a universal joint, said base plate and said lug having aligned apertures therethrough which extend through said surface portions, a locking member having a convex surface engageable with said plate concave surface, and a clamping member extending through said apertures and acting to clamp said surface portions together with said lug and base plate in adjusted position, said aperture being larger than the diameter of the clamping member to permit relative angular movement of said base plate and lug.

CURT SAURER.

References Cited in the file of this patent

UNITED STATES PATENTS

| Number | Name | Date |
|---|---|---|
| 1,219,513 | Wensinger | Mar. 20, 1917 |
| 1,515,982 | Willard | Nov. 18, 1924 |
| 1,599,246 | Ranger | Sept. 7, 1926 |
| 2,499,136 | Edlund et al. | Feb. 28, 1950 |

FOREIGN PATENTS

| Number | Country | Date |
|---|---|---|
| 32,040 | France | Aug. 29, 1927 |
| 36,635 | Denmark | Sept. 24, 1926 |
| 458,063 | Germany | Mar. 29, 1928 |
| 608,104 | France | July 21, 1926 |